(12) United States Patent
Iwata

(10) Patent No.: US 11,364,850 B2
(45) Date of Patent: Jun. 21, 2022

(54) RESIN MOLDED PRODUCT

(71) Applicant: TOYODA GOSEI CO., LTD., Kiyosu (JP)

(72) Inventor: Hiroshi Iwata, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/209,346

(22) Filed: Mar. 23, 2021

(65) Prior Publication Data
US 2021/0300254 A1    Sep. 30, 2021

(30) Foreign Application Priority Data

Mar. 25, 2020    (JP) .............................. JP2020-054468

(51) Int. Cl.
*B60R 7/06*       (2006.01)
*B29C 65/14*      (2006.01)
*B29C 65/00*      (2006.01)
*B29L 31/30*      (2006.01)

(52) U.S. Cl.
CPC ............ *B60R 7/06* (2013.01); *B29C 65/1412* (2013.01); *B29C 66/73921* (2013.01); *B29L 2031/3008* (2013.01); *B29L 2031/3038* (2013.01)

(58) Field of Classification Search
CPC . B60R 7/06; B29C 65/1412; B29C 66/73921; B29L 2031/3038; B29L 2031/3008
See application file for complete search history.

(56) References Cited

U.S. PATENT DOCUMENTS

2019/0091938 A1    3/2019    Matsui et al.

FOREIGN PATENT DOCUMENTS

| JP | 2014223883 A | * | 12/2014 | |
|---|---|---|---|---|
| JP | 2016010883 A | * | 1/2016 | ............. B29C 65/08 |
| JP | 2019-64013 A |   | 4/2019 | |

* cited by examiner

*Primary Examiner* — Francisco W Tschen
*Assistant Examiner* — Abhishek A Patwardhan
(74) *Attorney, Agent, or Firm* — Posz Law Group, PLC

(57) ABSTRACT

The lid portion has a first body, a first rib protruding from the first surface of the first body and extending along the first surface, and the storage section has a second body, a second rib protruding from the second surface of the second body and extending along the second surface. The first and second ribs have main welded portions welded at intersections crossing each other, and the lid portion and/or the storage portion has main welded portions extending from one of the first and second ribs to the other between the main welded portions adjacent to each other. The lid portion and/or the storage section has an auxiliary rib extending from one of the first and second ribs to the other between the adjacent main welded portions, and the auxiliary rib has a sub-welded portion that is welded to the other at the intersection with the other.

4 Claims, 3 Drawing Sheets

RESIN MOLDED PRODUCT

CROSS-REFERENCE TO RELATED APPLICATIONS

The present application claims the benefit of priority of Japanese Patent Application No. 2020-054468, filed on Mar. 25, 2020, the content of which is incorporated herein by reference.

TECHNICAL FIELD

The present invention relates to a resin molded product.

BACKGROUND

JP-A-2019-64013 discloses a resin molded product to be applied to an interior product for a vehicle. The resin molded product includes a first component and a second component both made of a resin. The first component includes a first main body portion and a first rib protruding from the first main body portion. The second component includes a second main body portion and a second rib protruding from the second main body portion.

In producing the resin molded product, a tip of the first rib of the first component and a tip of the second rib of the second component are irradiated with infrared rays to melt the tips, and then the tips are pressed together to weld the first component and the second component to each other.

SUMMARY

In the resin molded product described in JP-A-2019-64013, when the first component and the second component are assembled in a state deviated from a regular assembly position, there are problems that a welding area between the first rib and the second rib is small and welding strength decreases.

An object of the present invention is to provide a resin molded product in which welding strength can be improved.

A resin molded product for achieving the above object is formed by welding a first component and a second component, both made of a resin, to each other. The first component includes a first main body and a first rib that protrudes from a first surface of the first main body and that extends along the first surface. The second component includes a second main body and a second rib that protrudes from a second surface of the second main body facing the first surface and that extends along the second surface. The first rib and the second rib have a plurality of main welded portions where the first rib and the second rib are welded to each other at a plurality of intersections intersecting each other. At least one of the first component and the second component includes an auxiliary rib that extends from one of the first rib and the second rib toward the other of the first rib and the second rib between the main welded portions adjacent to each other. The auxiliary rib includes a sub-welded portion wherein the auxiliary rib is welded to the other of the first rib and the second rib at an intersection with the other of the first rib and the second rib.

According to this configuration, the first rib and the second rib have the plurality of main welded portions where the first rib and the second rib are welded to each other at the plurality of intersections intersecting each other. Therefore, even when the first component and the second component are assembled in a state deviated from a regular assembly position, a welding area of the main welded portion does not change. Accordingly, a decrease in welding strength can be prevented.

In addition, the auxiliary rib provided on at least one of the first component and the second component includes the sub-welded portion where the auxiliary rib is welded to the other of the first rib and the second rib at the intersection with the other of the first rib and the second rib. Accordingly, the number of welding points between the first rib and the second rib increases, so that the welding strength can be improved.

Therefore, the welding strength between the first rib and the second rib can be improved, so that a thickness of each rib can be reduced and the number of each rib can be reduced. Accordingly, an amount of resin can be reduced.

It is preferable that, in the above resin molded product, the first rib includes a straight line portion extending linearly, the second rib includes a wavy portion extending wavily about a center line extending along the straight line portion, and the main welded portion is formed by the straight line portion and the wavy portion.

According to this configuration, the main welded portion can be easily embodied by the straight line portion of the first rib and the wavy portion of the second rib.

It is preferable that, in the resin molded product, three or more main welded portions adjacent to each other are formed at an equal interval in an extending direction of the straight line portion.

According to this configuration, the interval between the main welded portions is constant, so that a variation in welding strength caused by the position can be prevented. It is preferable that, in the resin molded product, the sub-welded portion is provided at a central position between the main welded portions adjacent to each other in the extending direction of the straight line portion.

According to this configuration, between the main welded portions, an interval between one main welded portion and the sub-welded portion and an interval between the other main welded portion and the sub-welded portion are the same, so that a variation in welding strength caused by the position can be prevented.

According to the present invention, the welding strength of the resin molded product can be improved.

DESCRIPTION OF EMBODIMENTS

Hereinafter, an embodiment of a resin molded product will be described with reference to FIG. 1 to FIG. 4. In the present embodiment, the present invention is embodied as a glove box provided on a dashboard in the front of a vehicle compartment.

Figure 1:
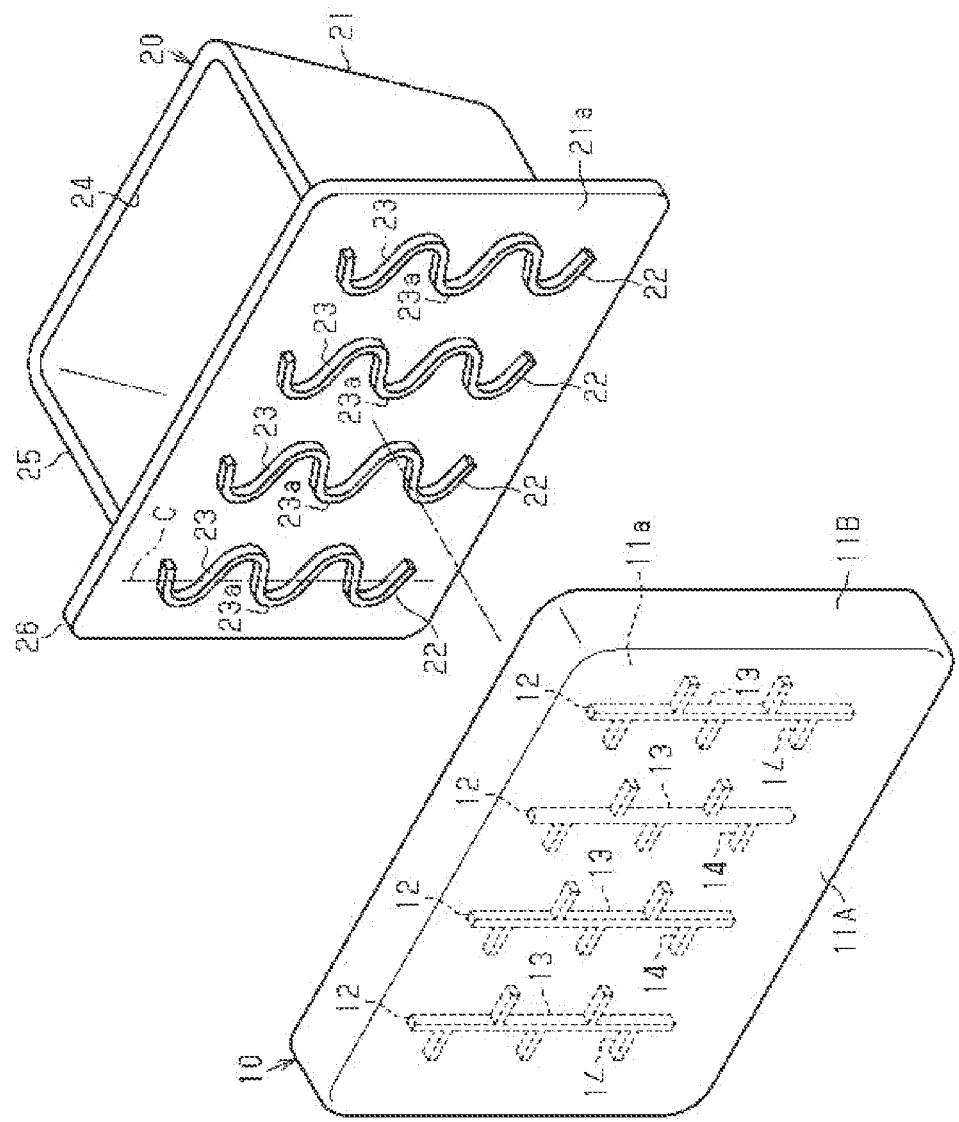
FIG. 1 is a perspective view showing an embodiment of a resin molded product in which a lid portion and a storage portion are disassembled from each other.

As shown in FIG. 1, the glove box includes a lid portion 10 for storing small items and opening and closing an opening (not shown) of the dashboard, and a storage portion 20 drawably supported inside the dashboard via the opening. The lid portion 10 and the storage portion 20 are both made of a resin.

First, the configuration of the lid portion 10 will be described.

As shown in FIG. 1, the lid portion 10 includes a first main body 11A having a substantially rectangular plate shape, a peripheral wall 11B protruding from a peripheral edge portion of the first main body 11A toward the storage portion 20, and first ribs 12 each protruding from a first surface 11a of the first main body 11A. The first surface 11a is a surface of the first main body 11A opposite to a vehicle compartment side. A skin material is attached to a surface of the first main body 11A opposite to the first surface 11a and an outer peripheral surface of the peripheral wall 11B. The lid portion 10 corresponds to a first component according to the present embodiment.

Figure 2:
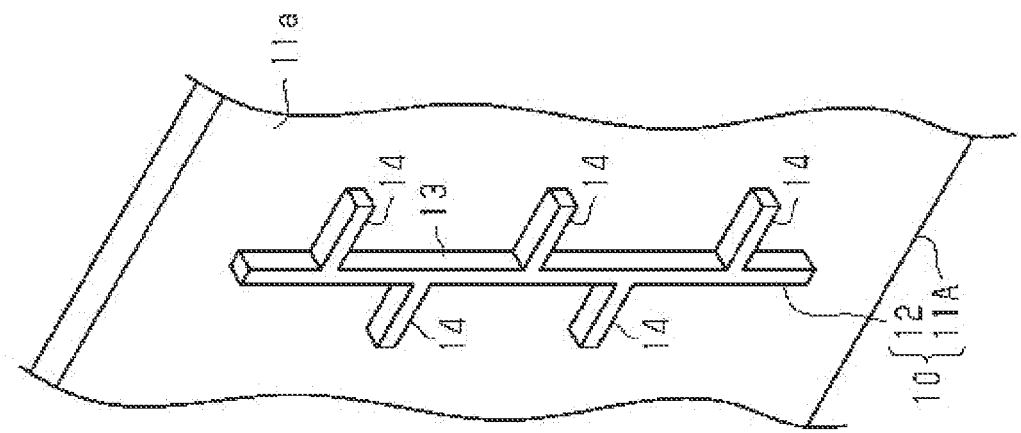
FIG. 2 is a perspective view showing a straight line portion and an auxiliary rib in a first rib.
Figure 3:
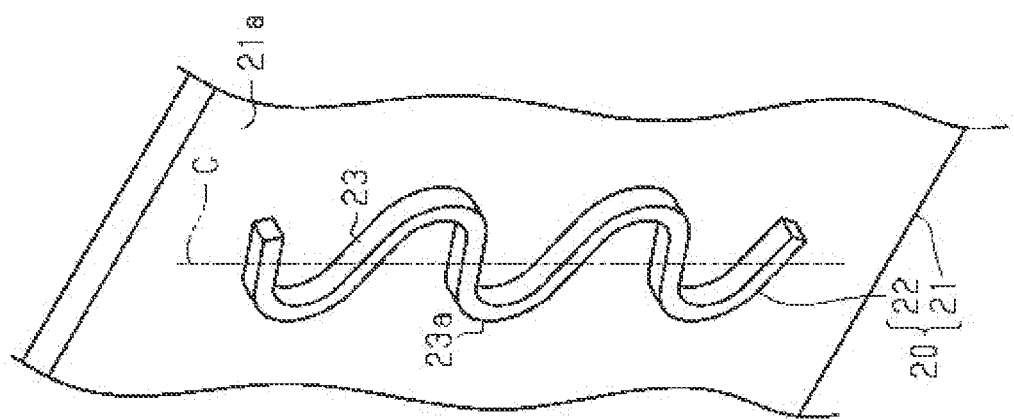
FIG. 3 is a perspective view showing a second rib.

As shown in FIG. 1 and FIG. 2, each first rib 12 extends along the first surface 11a. The first rib 12 includes a straight line portion 13 extending linearly and a plurality of auxiliary ribs 14 extending orthogonal to the straight line portion 13 and from the straight line portion 13. Specifically, four first ribs 12 are provided in parallel on the first surface 11a of the first main body 11A, and respective straight line portions 13 extend in parallel with each other. In addition, each first rib 12 is provided with five auxiliary ribs 14.

Next, the configuration of the storage portion 20 will be described.

As shown in FIG. 1, the storage portion 20 includes a second main body 21, and second ribs 22 each protruding from a second surface 21a of the second main body 21 facing the first surface 11a. The storage portion 20 corresponds to a second component according to the present embodiment.

The second main body 21 includes a box portion 25 having an opening 24, and a plate portion 26 which has a substantially rectangular plate shape and is formed integrally with the box portion 25 and to which the lid portion 10 is to be welded.

As shown in FIG. 1 to FIG. 4, each second rib 22 extends along the second surface 21a. The second rib 22 includes a wavy portion 23 extending wavily about a center line C extending along the straight line portion 13 of the first rib 12. The wavy portion 23 in the present embodiment has a sinusoidal shape having a constant wavelength and amplitude. Four second ribs 22 are provided in parallel on the second surface 21a of the second main body 21. Each second rib 22 faces corresponding first rib 12 on the first surface 11a.

Figure 4:
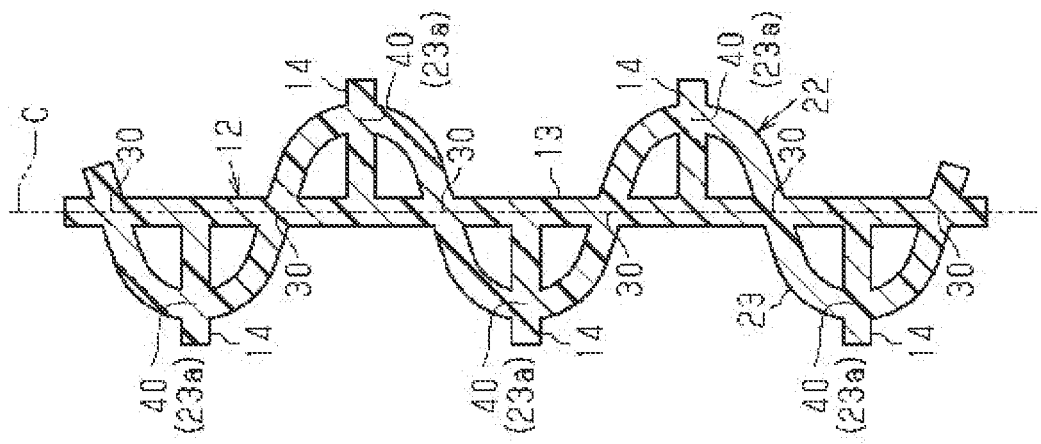
FIG. 4 is a cross-sectional view at a position including a welded portion between the first rib and the second rib.

As shown in FIG. 4, the glove box is formed by welding the ribs 12 and 22 of the lid portion 10 and the storage portion 20 to each other.

As shown in FIG. 4, the first rib 12 and the second rib 22 have a plurality of main welded portions 30 where the first rib 12 and the second rib 22 are welded to each other at a plurality of intersections intersecting each other.

The main welded portions 30 are formed at an equal interval in an extending direction of the straight line portion 13. In the present embodiment, six main welded portions 30 are formed for each pair of first rib 12 and second rib 22.

The auxiliary rib 14 includes a sub-welded portion 40 where the auxiliary rib 14 is welded to the second rib 22 at an intersection with the second rib 22.

The sub-welded portion 40 is provided at a central position between the main welded portions 30 adjacent to each other in the extending direction of the straight line portion 13. That is, the intersection between the auxiliary rib 14 and the second rib 22 coincides with an apex 23a of the wavy portion 23, and the sub-welded portion 40 is formed by welding the auxiliary rib 14 to the apex 23a of the wavy portion 23. In the present embodiment, five sub-welded portions 40 are formed.

Next, a method of producing the glove box by welding the lid portion 10 to the storage portion 20 will be described.

First, as shown in FIG. 1, the lid portion 10 and the storage portion 20 are fixed to a movable jig and a fixed jig (both are not shown), respectively, to make the first surface 11a of the lid portion 10 and the second surface 21a of the storage portion 20 face each other with a gap therebetween.

Then, the first ribs 12 of the lid portion 10 and the second ribs 22 of the storage portion 20 are irradiated with infrared rays using an infrared welding device (not shown). Accordingly, tips of the ribs 12 and 22 are heated to a predetermined temperature and melted.

Next, the tips of the ribs 12 and 22 are brought into contact with each other by relatively moving the movable jig in a direction in which the lid portion 10 approaches the storage portion 20.

At this time, the straight line portion 13 of the first rib 12 and the wavy portion 23 of the second rib 22 are in contact with each other at an intersection. In addition, the auxiliary rib 14 of the first rib 12 and the wavy portion 23 of the second rib 22 are in contact with each other at an intersection.

Next, the tips of the ribs 12 and 22 are pressed against each other by further moving the movable jig in the above direction. At this time, the straight line portion 13 of the first rib 12 and the wavy portion 23 of the second rib 22 are welded at the intersection of each other to form the main welded portion 30. In addition, the auxiliary rib 14 of the first rib 12 and the wavy portion 23 of the second rib 22 are welded at the intersection with each other to form the sub-welded portion 40. Accordingly, the lid portion 10 and the storage portion 20 are welded and integrated to each other.

Next, operation and effects of the present embodiment will be described.

(1) The lid portion 10 includes the auxiliary rib 14 extending from the first rib 12 toward the second rib 22 between the main welded portions 30 adjacent to each other, and the auxiliary rib 14 includes the sub-welded portion 40 where the auxiliary rib is welded to the second rib 22 at the intersection with the second rib 22.

According to this configuration, the first rib 12 and the second rib 22 have a plurality of main welded portions 30 where the first rib 12 and the second rib 22 are welded to each other at a plurality of intersections intersecting each other. Therefore, even when the lid portion 10 and the storage portion 20 are assembled in a state deviated from a regular assembly position, a welding area of the main welded portion 30 does not change. Accordingly, a decrease in welding strength can be prevented.

The auxiliary rib 14 prodded on the lid portion 10 includes the sub-welded portion 40 where the auxiliary rib 14 is welded to the second rib 22 at the intersection with the second rib 22. Accordingly, the number of welding points between the first rib 12 and the second rib 22 increases, so that the welding strength can be improved.

Therefore, the welding strength between the first rib 12 and the second rib 22 can be improved, so that the thickness of each rib 12, 22 can be reduced and the number of each rib 21, 22 can be reduced. Accordingly, an amount of resin can be reduced.

Further, according to the above configuration, the auxiliary rib 14 extends from the first rib 12, so that the first rib 12 is supported by the auxiliary rib 14. Therefore, the first rib 12 is less likely to break. Accordingly, the thickness of the first rib 12 can be reduced. Therefore, the amount of resin can be reduced.

(2) The first rib 12 includes the straight line portion 13 extending linearly, the second rib 22 includes the wavy portion 23 extending wavily about the center line C extending along the straight line portion 13, and the main welded portion 30 is formed by the straight line portion 13 and the wavy portion 23.

According to this configuration, the main welded portion 30 can be easily embodied by the straight line portion 13 of the first rib 12 and the wavy portion 23 of the second rib 22.

(3) Three or more main welded portions 30 adjacent to each other are formed at an equal interval in the extending direction of the straight line portion 13.

According to this configuration, the interval between the main welded portions 30 is constant, so that a variation in welding strength caused by the position can be prevented.

(4) The sub-welded portion 40 is provided at the central position between the main welded portions 30 adjacent to each other in the extending direction of the straight line portion 13.

According to this configuration, between the main welded portions 30, the interval between one main welded portion 30 and the sub-welded portion 40 and the interval between the other main welded portion 30 and the sub-welded portion 40 are the same, so that a variation in welding strength caused by the position can be prevented.

<Modification>

The present embodiment can be modified and implemented as follows. The present embodiment and the following modifications can be implemented in combination with each other as long as they do not have technical contradiction.

The auxiliary rib 14 is not limited to intersecting the apex 23a of the wavy portion 23 in the second rib 22. That is, the auxiliary rib 14 is not limited as long as it includes the sub-welded portion 40 between the main welded portions 30 adjacent to each other in the extending direction of the straight line portion 13.

The number of the auxiliary rib 14 extending from the first rib 12 is not limited to five and can be changed optionally. In this case, the number is not limited as long as at least one auxiliary rib 14 extends from the first rib 12.

The auxiliary rib 14 is not limited to extending from the first rib 12 toward the second rib 22, and may, for example, extend from the second rib 22 toward the first rib 12.

Figure 5:
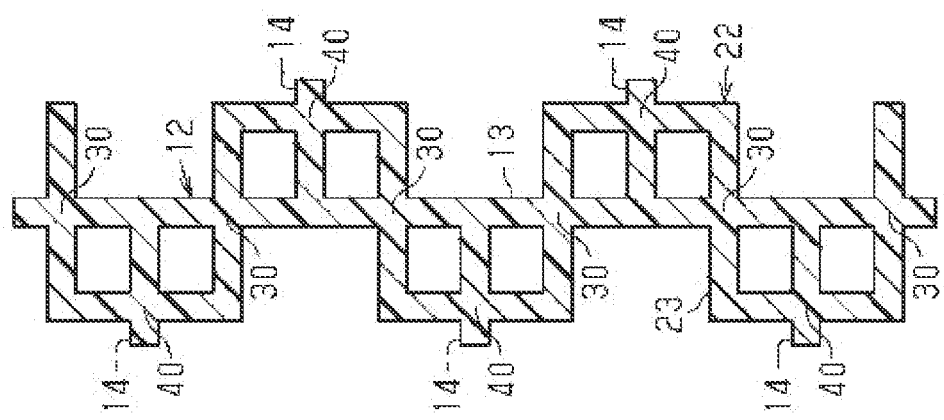
FIG. 5 is a cross-sectional view at a position including a welded portion between the first rib and a second rib according to a first modification.
Figure 6:
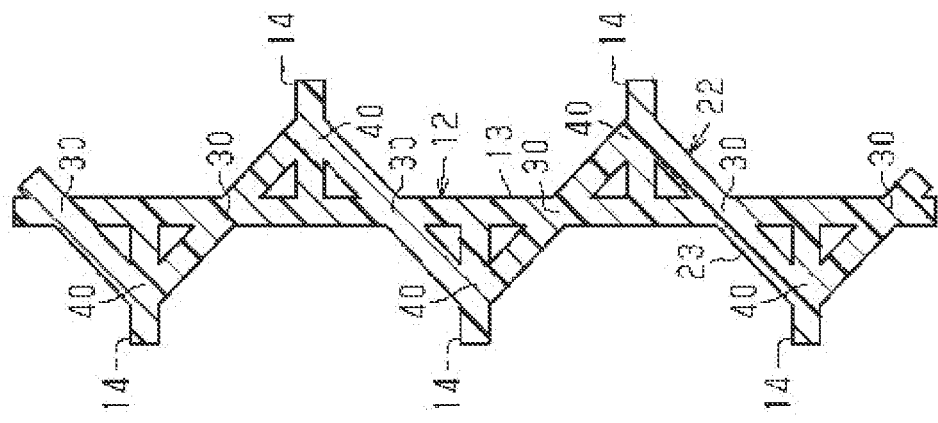
FIG. 6 is a cross-sectional view at a position including a welded portion between the first rib and a second rib according to a second modification.

Regarding the shape, the second rib 22 is not limited to including the wavy portion 23 in a sinusoidal shape as exemplified in the present embodiment. That is, as shown in FIG. 5, the second rib 22 may include a wavy portion 23 having a rectangular wave shape. In addition, as shown in FIG. 6, the second rib 22 may include a wavy portion 23 having a triangular wave shape.

The shape of the second rib 22 is not limited to the one in which the main welded portions 30 are formed at an equal interval in the extending direction of the straight line portion 13 as exemplified in the present embodiment. That is, the shape of the second rib 22 may be such that a plurality of main welded portions 30 are arranged at different intervals in the extending direction of the straight line portion 13.

Regarding the shape, the first rib 12 is not limited to having the straight line portion 13 as exemplified in the present embodiment, and the shape can be changed as appropriate. For example, the first rib 12 may include a curved portion extending in a curved shape, or may include both a straight line portion 13 and a curved portion. In this case, the number of the main welded portion 30 between the first rib 12 and the second rib 22 is not limited to six as long as the first rib 12 and the second rib 22 have at least two main welded portions 30.

The lid portion 10 is not limited to including four first ribs 12 as exemplified in the present embodiment. That is, the number of the first rib 12 in the lid portion 10 is not limited as long as there is at least one first rib 12. In this case, the storage portion 20 is provided with the second rib 22 in a number corresponding to that of the first rib 12.

In the present embodiment, the infrared welding method has been exemplified as a method for welding the ribs 12 and 22, but the method for welding the first rib 12 and the second rib 22 is not limited to the infrared welding method. For example, a hot plate welding method or the like can also be used.

The resin molded product according to the present invention is not limited to the glove box, and can be applied to, for example, resin-made interior products for vehicles such as center consoles and airbag devices for vehicles.

The resin molded product according to the present invention is not limited to the resin molded product for vehicles, and the present invention can be applied as long as it is formed by welding a first component and a second component both made of a resin.

What is claimed is:

1. A resin molded product formed by welding a first component and
a second component, both made of a resin, to each other, wherein
the first component includes a first main body and a first rib that protrudes from a first surface of the first main body and that extends along the first surface,
the second component includes a second main body and a second rib that protrudes from a second surface of the second main body facing the first surface and that extends along the second surface,
the first rib and the second rib have a plurality of main welded portions where the first rib and the second rib are welded to each other at a plurality of intersections intersecting each other,
the first component includes an auxiliary rib that extends from the first rib toward the second rib between the main welded portions adjacent to each other, and
the auxiliary rib includes a sub-welded portion where the auxiliary rib is welded to the second rib at an intersection with the second rib,
the first rib includes a straight line portion extending linearly,
the second rib includes a wavy portion extending wavily about a center line extending along the straight line portion, the wavy portion having a sinusoidal shape, and
the main welded portion is formed by the straight line portion and the wavy portion.

2. The resin molded product according to claim 1, wherein three or more main welded portions adjacent to each other are formed at equal intervals in an extending direction of the straight line portion.

3. The resin molded product according to claim 1, wherein the sub-welded portion is provided at a central position between the main welded portions adjacent to each other in the extending direction of the straight line portion.

4. The resin molded product according to claim 2, wherein the sub-welded portion is provided at a central position between the main welded portions adjacent to each other in the extending direction of the straight line portion.

* * * * *